(12) United States Patent
Raes et al.

(10) Patent No.: US 7,296,969 B2
(45) Date of Patent: Nov. 20, 2007

(54) PROPELLER PITCH CHANGE SYSTEM

(75) Inventors: Mark R. Raes, Andover, CT (US);
Paul A. Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 114 days.

(21) Appl. No.: 11/248,823

(22) Filed: Oct. 12, 2005

(65) Prior Publication Data
US 2007/0081897 A1    Apr. 12, 2007

(51) Int. Cl.
*B64C 27/50* (2006.01)
(52) U.S. Cl. .......................... 416/36; 416/48
(58) Field of Classification Search ................. 416/36, 416/48, 147, 153, 155, 159, 167
See application file for complete search history.

(56) References Cited
U.S. PATENT DOCUMENTS

| | | | |
|---|---|---|---|
| 2,640,555 A | * | 6/1953 | Cushman ...................... 416/36 |
| 5,431,539 A | | 7/1995 | Carvalho |
| 6,511,292 B2 | * | 1/2003 | Perkinson et al. ............ 416/48 |
| 6,981,844 B2 | * | 1/2006 | Perkinson et al. ............. 416/1 |

* cited by examiner

*Primary Examiner*—Igor Kershteyn
(74) *Attorney, Agent, or Firm*—Carlson, Gaskey & Olds

(57) ABSTRACT

A pitch change system includes a yoke assembly which receives a pitch trunnion that extends from each propeller blade assembly. Each pitch trunnion is received within a respective bearing assembly mounted in the yoke assembly. The bearing assemblies are mounted between a forward yoke plate and an aft yoke plate. A spacer is mounted between each adjacent bearing assembly to position and restrain each bearing assembly. Each spacer includes an extension which retains the adjacent bearing assembly on a pitch trunnion pin in a direction generally parallel to axis. Each of the bearing assemblies includes a generally rectilinear outer race and a spherical inner race inside diameter to receive the pitch trunnion pin. The rectilinear outer race reduces contact stresses to acceptable levels for high load applications yet permits blade installation without actuator disassembly.

17 Claims, 10 Drawing Sheets

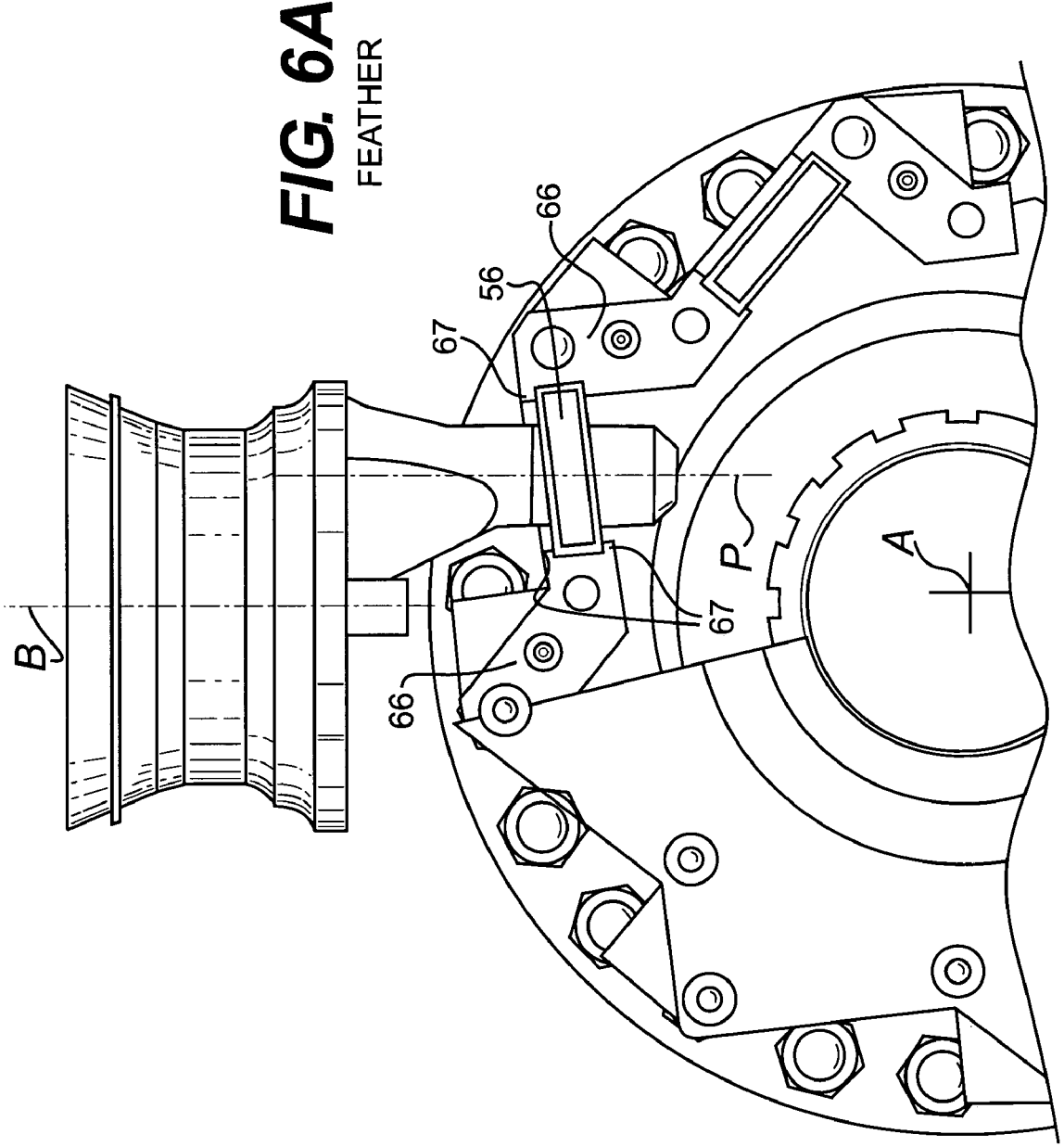

MID-STROKE

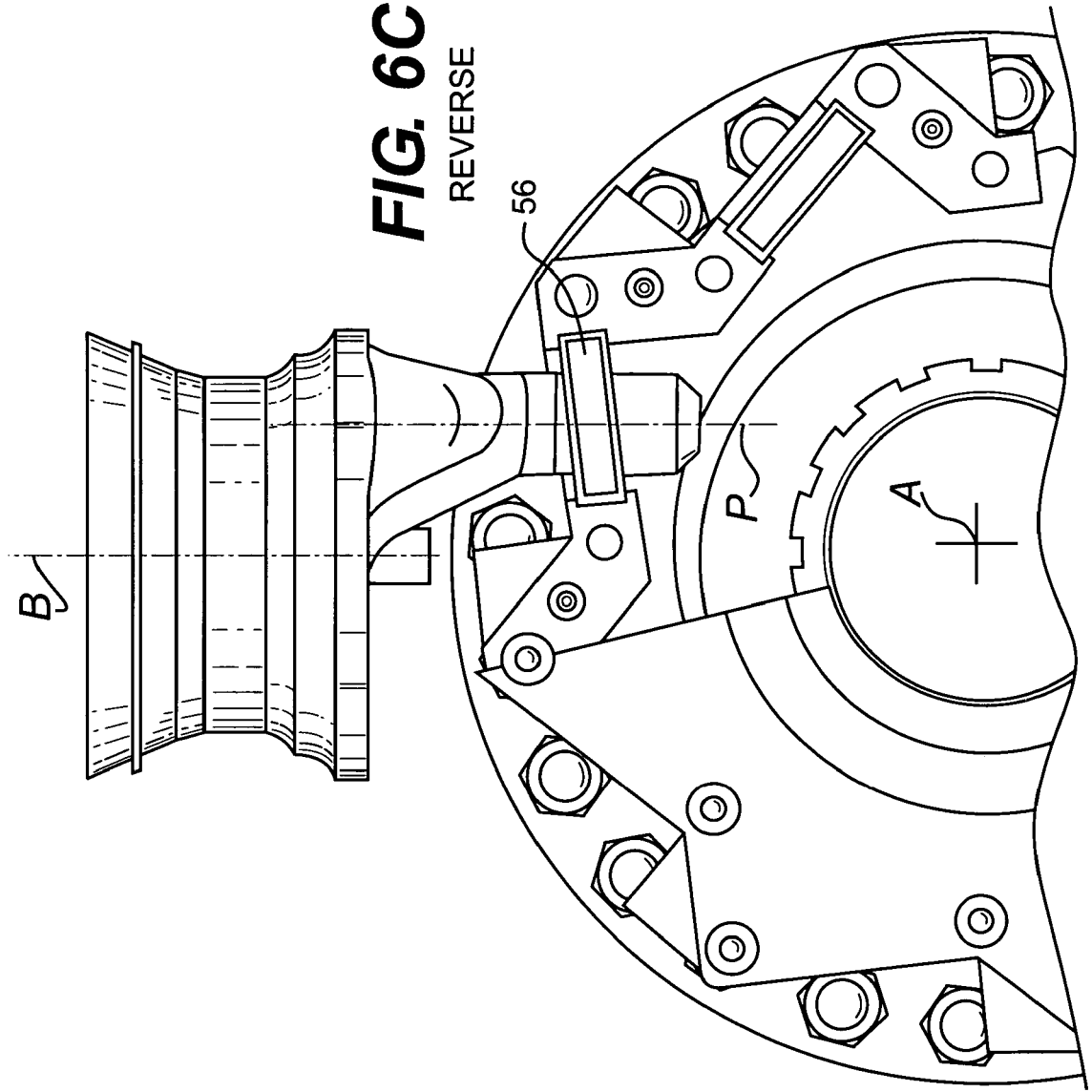

PROPELLER PITCH CHANGE SYSTEM

BACKGROUND OF THE INVENTION

The present invention relates to a propeller system, and more particularly to a bearing system for a pitch change system therefor.

Typical propeller pitch change systems utilize a scotch yoke type mechanism to convert linear motion of a hydraulic piston into the rotational motion of the propeller blades such that a dynamic interface is required between the propeller blade pin, roller bearing and the yoke assembly. As horsepower increases, the loads imposed on the pitch change system correspondingly increase. This increase in load necessarily requires a size increase in the pitch change components due to the high contact stresses associated with the interaction of the roller bearings with the yoke assembly. Increasing roller size to reduce the contact stress to a reasonable level eventually becomes size prohibitive with regard to maintenance and assembly. That is, blade removal would be prohibited as the roller becomes too large to pass through the hub blade retention opening.

Various pitch change systems avoid this sizing limitation by utilizing links with self-aligning spherical bearings which connect the yoke assembly with the propeller blade trunnion pin. Although effective, a somewhat complicated system with multiple linkages is required which may increase maintenance demands.

Accordingly, it is desirable to provide a pitch change system which accommodates significant horsepower, facilitates maintenance, and minimizes the pitch change system physical envelope.

SUMMARY OF THE INVENTION

A pitch change system according to the present invention includes a yoke assembly which receives a pitch trunnion that extends from each propeller blade assembly. The pitch trunnion is offset from the blade axis such that as the yoke assembly transits axially along the axis, the pitch trunnion is rotated about the blade axis to effectuate a pitch change in the blade assembly. Each pitch trunnion is received within a respective bearing assembly mounted in the yoke assembly. The bearing assemblies are mounted between a forward yoke plate and an aft yoke plate mounted to a sliding yoke shaft. A spacer is mounted between each adjacent bearing assembly to position and restrain each bearing assembly between the yoke plates.

Each of the bearing assemblies includes a generally rectilinear outer race and a spherical inner race inside diameter to receive a pitch trunnion pin. The rectilinear outer race is retained by the adjacent spacers and the yoke plates which reduces contact stresses to acceptable levels for high load applications. A clearance is provided between the rectilinear outer race and the spacers to accommodate blade and pitch trunnion tolerances.

In operation, axial moment of the yoke assembly and movement of the pitch trunnion pin is accommodated by the bearing assemblies. The bearing assemblies articulate and translate along the pitch trunnion pin as well as permit rotation of the actuator and the yoke assembly.

The present invention therefore provides a pitch change system which accommodates significant horsepower, facilitates maintenance, and minimizes the pitch change system physical envelope.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIGS. 6A-6C are rear perspective partial fragmented views of the pitch change system in a feather, top dead center; and reverse position.

DETAILED DESCRIPTION OF THE PREFERRED EMBODIMENT

Figure 1:
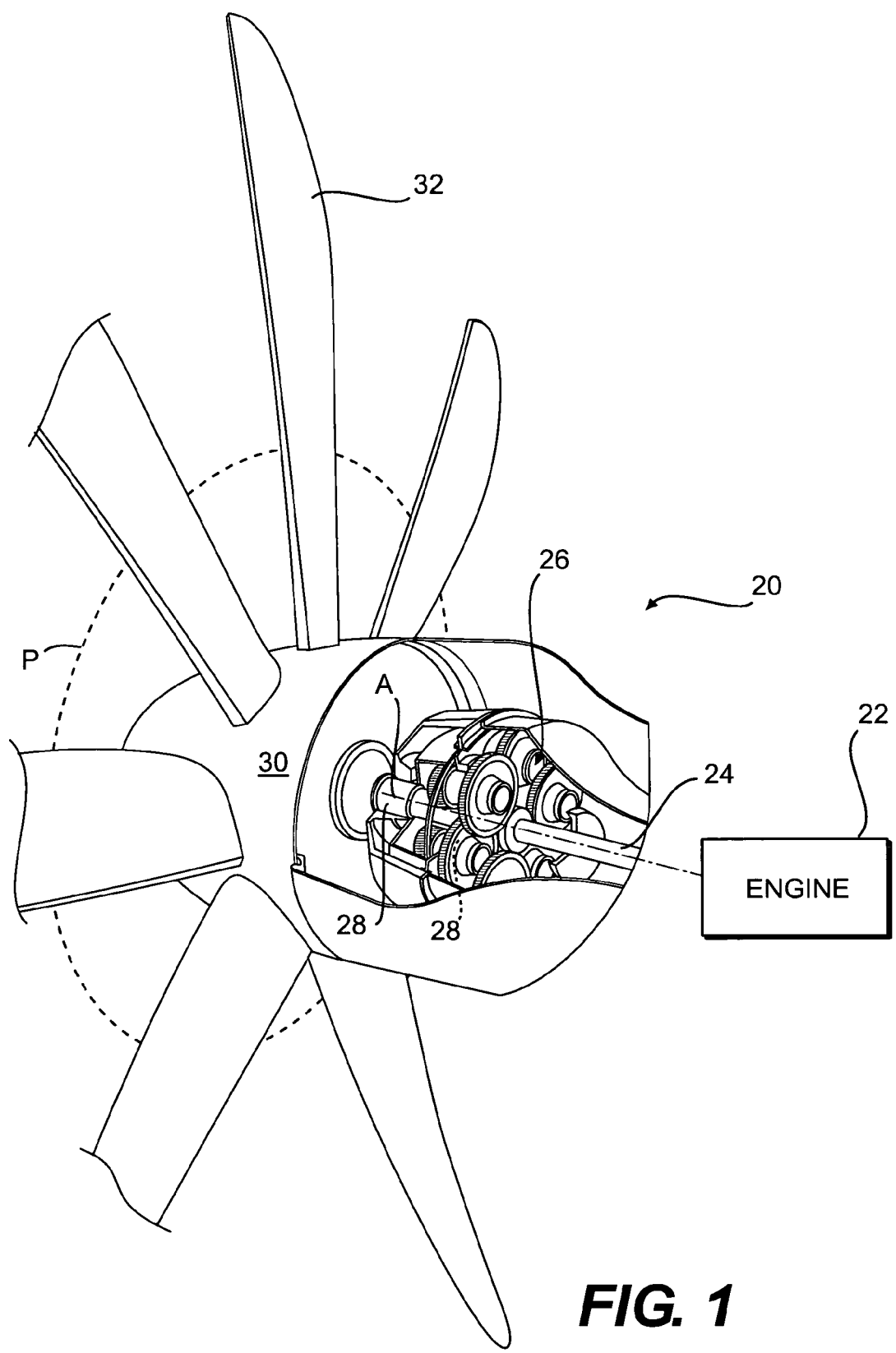
FIG. 1 is a general perspective view an exemplary propeller system for use with the present invention.

FIG. 1 illustrates a general perspective view of a propeller system 20 driven by a gas turbine engine (illustrated schematically at 22) which rotates a turbine output shaft 24 at a high speed. The turbine output shaft 24 drives a gear reduction gearbox (illustrated somewhat schematically at 26) which decrease shaft rotation speed and increase output torque. The gearbox 26 drives a propeller shaft 28 which rotates a propeller assembly hub 30 with a plurality of blade assemblies 32 which extend therefrom.

Axis A is substantially perpendicular to a plane P which is defined by the blade assemblies 32. It should be understood that although a propeller system typical of a turboprop aircraft is illustrated in the disclosed embodiment, various prop/rotor systems including tilt rotor and tilt wing systems will benefit from the present invention.

Figure 2:
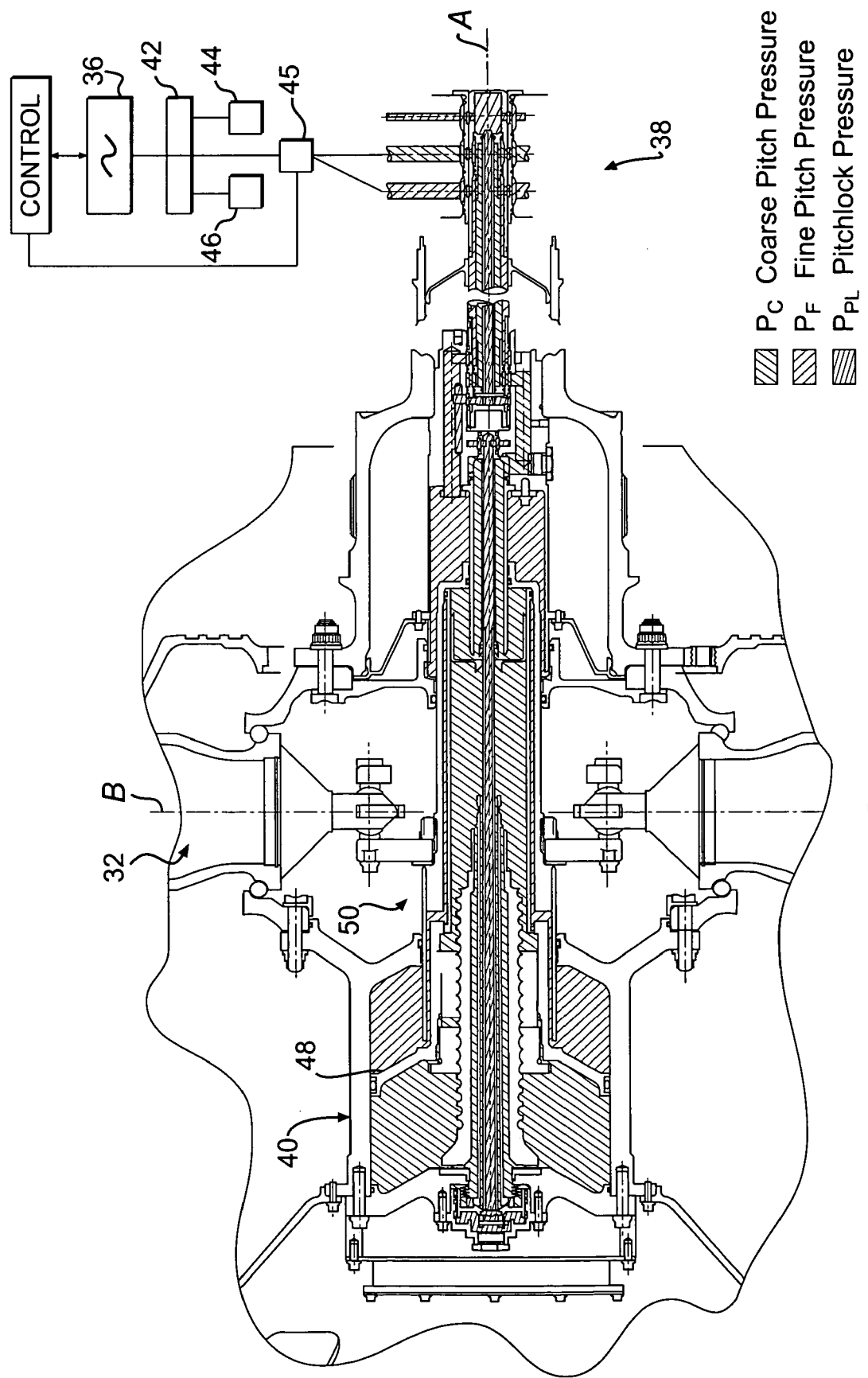
FIG. 2 is a sectional view along a rotor hub axis of rotation.

Referring to FIG. 2, a schematic sectional view of the propeller system 20 is illustrated. A main pump 36, for actuating the various mechanism disclosed herein, provides hydraulic pressure. Main pump 36 provides a pressure indicated generally by the appropriately shaded areas and more specifically by the $P_{subscript}$ designations. The main pump 36 provides fluid pressure to a transfer bearing 38 through a pressure regulating valve 42 and an electrically driven control valve 45. A high pressure relief valve 46 and a feather system 44 are also preferably located between the main pump 36 and the transfer bearing 38. It should be understood that various actuation systems may be utilized with the present invention.

Generally, by selectively communicating coarse pitch change pressure $P_C$ and fine pitch change pressure $P_f$ speed governing, synchrophasing, beta control, feathering and unfeathering of the blade assemblies 32 is provided.

Figure 3:
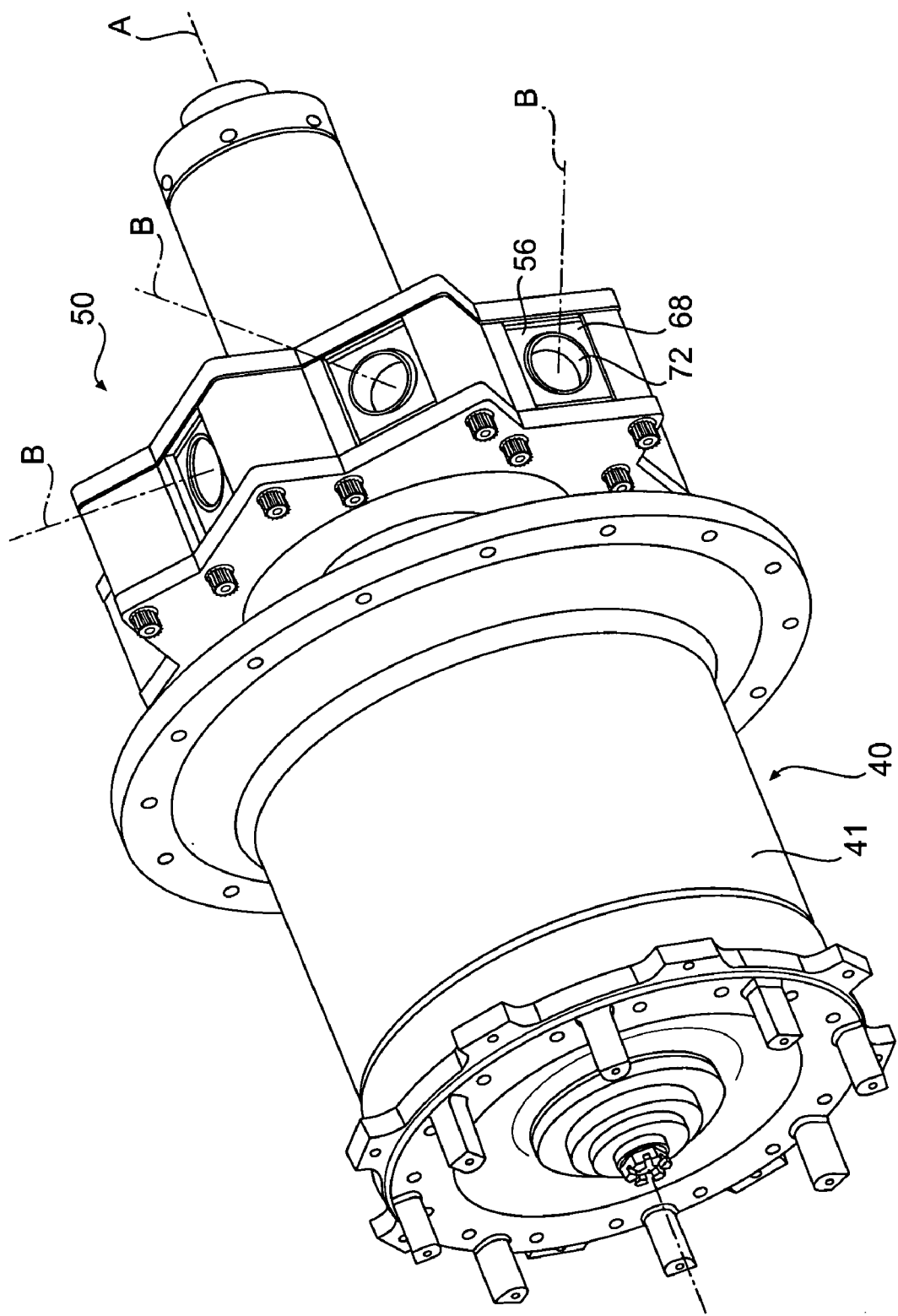
FIG. 3 is a general perspective view of a pitch change system.

A pitch change actuator assembly 40 contains a pitch change actuator piston 48 located between a coarse pitch actuator chamber $P_C$ and a fine pitch actuator chamber $P_f$ which are respectively supplied with coarse pitch change pressure $P_C$ and fine pitch change pressure $P_f$ such that the pitch change actuator piston 48 is axially driven by differential pressure therebetween. The pitch change actuator assembly 40 preferably includes a housing portion 41 which forms a portion of the propeller hub assembly 30 (also illustrated in FIG. 3). The pitch change actuator piston 48 translates along axis A to drive a pitch change system 50 and effectuate a pitch change in each of the blade assemblies 32. Translation of the pitch change system 50 pitches the blade assemblies 32 between high (feather) and low (reverse) pitch positions, also referred to as course and fine pitch.

Figure 4:
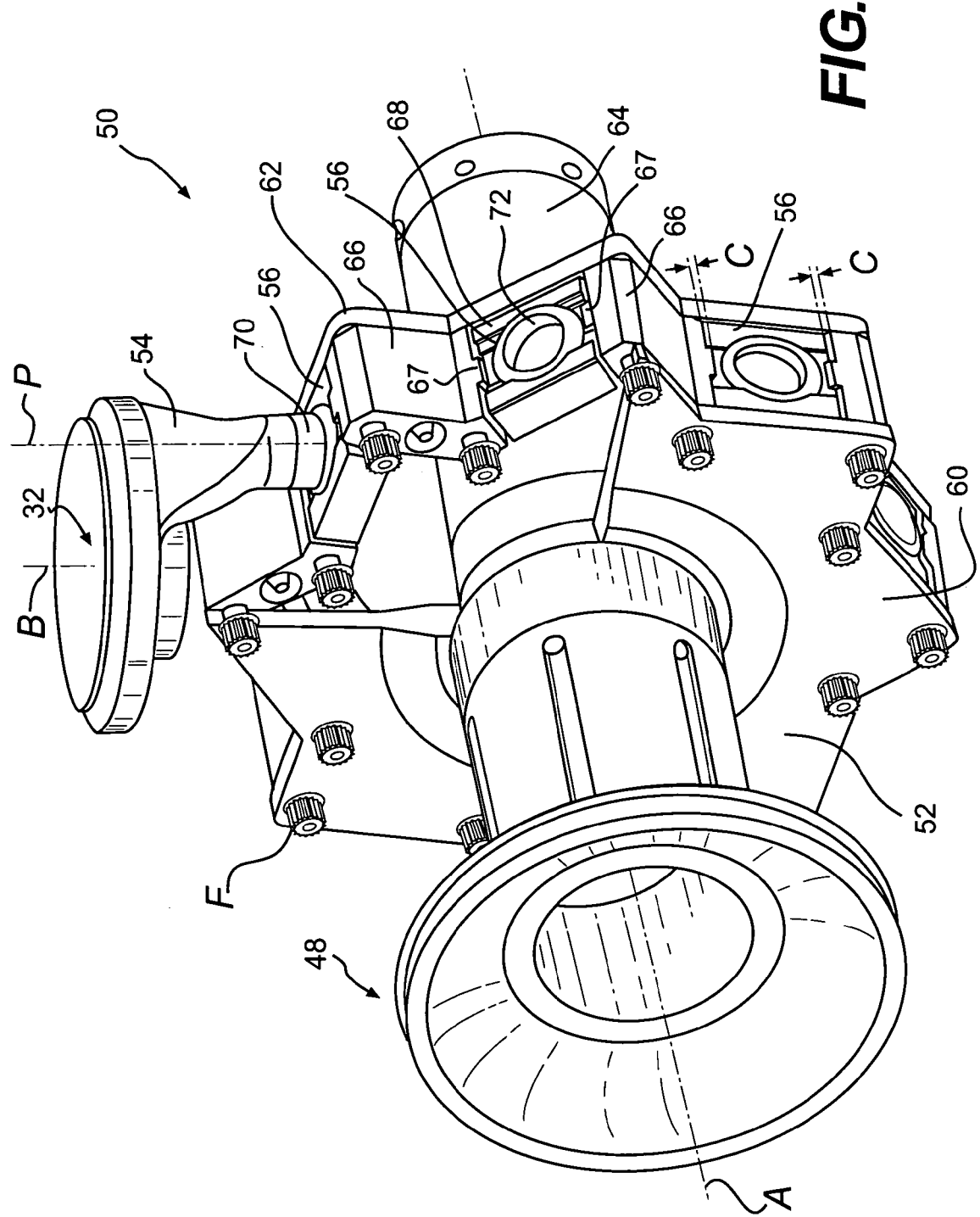
FIG. 4 is a partial fragmented view of a yoke assembly.

Referring to FIG. 4, the pitch change system 50 includes a yoke assembly 52 which receives a pitch trunnion 54 which extends from each blade assembly 32. The pitch trunnion 54 is offset from the blade axis B such that as the yoke assembly 52 transits axially along axis A, the pitch trunnion 54 is rotated in an arcuate manner about axis B to effectuate a pitch change in the blade assembly 32. The yoke assembly 52 is generally free to rotate about axis A but is rotationally positioned by the pitch trunnions 54 as the hydraulic pressure from the pitch change actuator piston 48 connected thereto positions the yoke assembly 52 axially along axis A.

Each pitch trunnion 54 is received within a respective bearing assembly 56 mounted in the yoke assembly 52. The bearing assemblies 56 are mounted between a forward yoke plate 60 and an aft yoke plate 62 which extend about a sliding yoke shaft 64. A spacer 66 is mounted between each adjacent bearing assembly 56 to position and restrain each bearing assembly 56 between the yoke plates 60, 62. The aft yoke plate 62 as disclosed in the illustrated embodiment is not mounted directly to the yoke shaft 64, but mounts to the spacers 66 in the form of a backing plate for the forward yoke plate 60. It should be understood, however, that various plate and non-plate arrangements as well as continuous and discontinuous retentions will be usable as an aft yoke-plate with the present invention.

Each spacer 66 is preferably fastened between the yoke plates 60, 62 with threaded fasteners f such as bolts or the like such that as the yoke assembly 52 transits axially and rotates about axis A as a unit. The fasteners f, yoke plates 60, 62, and spacers 66 pull blade assemblies 32 to a common blade angle. It should be understood that the yoke plates 60, 62 may also be formed directly to the sliding yoke shaft 64 and that the yoke plates 60, 62 and/or the spacers 66 may be internal components.

Each spacer 66 includes an extension 67 to restrain the adjacent bearing assembly 56 in a direction generally parallel to axis B. That is, the primary loads on the bearing assemblies 56 are generally parallel to axis A and are accommodated by the yoke plates 60, 62 such that the extension 67 need just primarily retain the bearing assemblies 56 along the pitch trunnion against centrifugal forces.

Each of the bearing assemblies 56 includes a generally rectilinear outer race 68 and a spherical inner race inside diameter 72 to receive the pitch trunnion 54. The rectilinear outer race 68 is preferably a square shape which is retained by the adjacent spacers 66 and the yoke plates 60, 62. The rectilinear outer race 68 significantly reduces contact stresses to acceptable levels for high load applications.

Preferably, a clearance C (also illustrated in FIGS. 5A and 5C) is provided at least between the rectilinear outer race 68 and the spacers 66 generally transverse to the pitch trunnion pin axis P to accommodate blade and pitch trunnion tolerances. That is, tolerances between axis B and axis P are readily accommodated by the clearance C. It should be understood that the clearances may also be provided. The rotation of the yoke about axis A accommodates motion of the pitch trunnion 54 as the blade assembly 32 pitches through a pitch change angle between Lmin to Lmax as it pitches from Feather+(FIGS. 5A and 6A) to Top Dead Center (FIGS. 5B and 6B) and on to Reverse–(FIGS. 5C and 6C). It should be understood that once the pitch trunnion pin 70 is installed within the bearing assemblies 56, the bearing assembly 56 is constrained fore and aft along axis A through the yoke plates 60, 62 to a predetermined pitch tolerance.

Figure 5A:
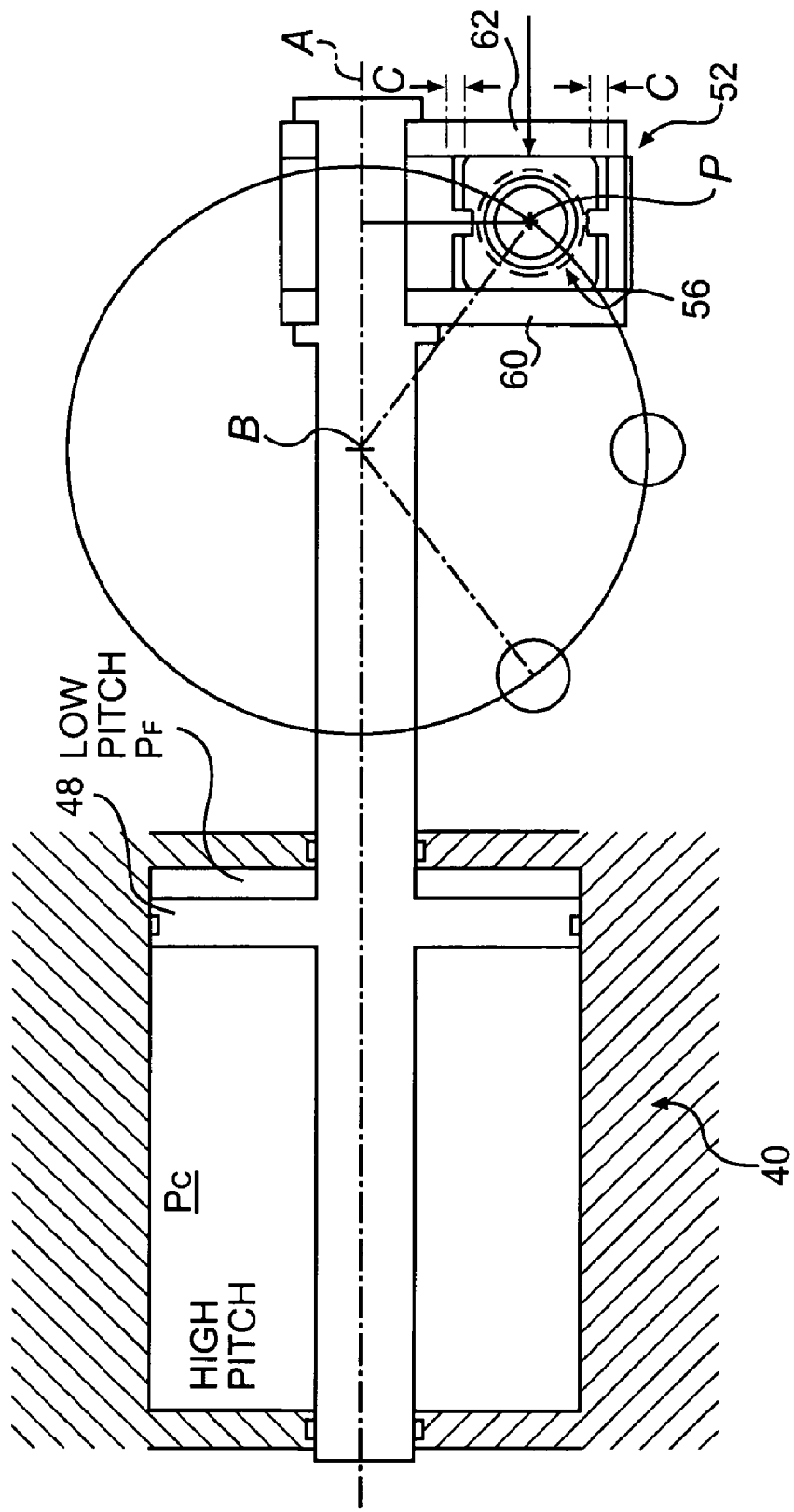
FIGS. 5A-5C is a schematic representation of the pitch change system in a feather, top dead center; and reverse position along the rotor hub axis of rotation.
Figure 6B:
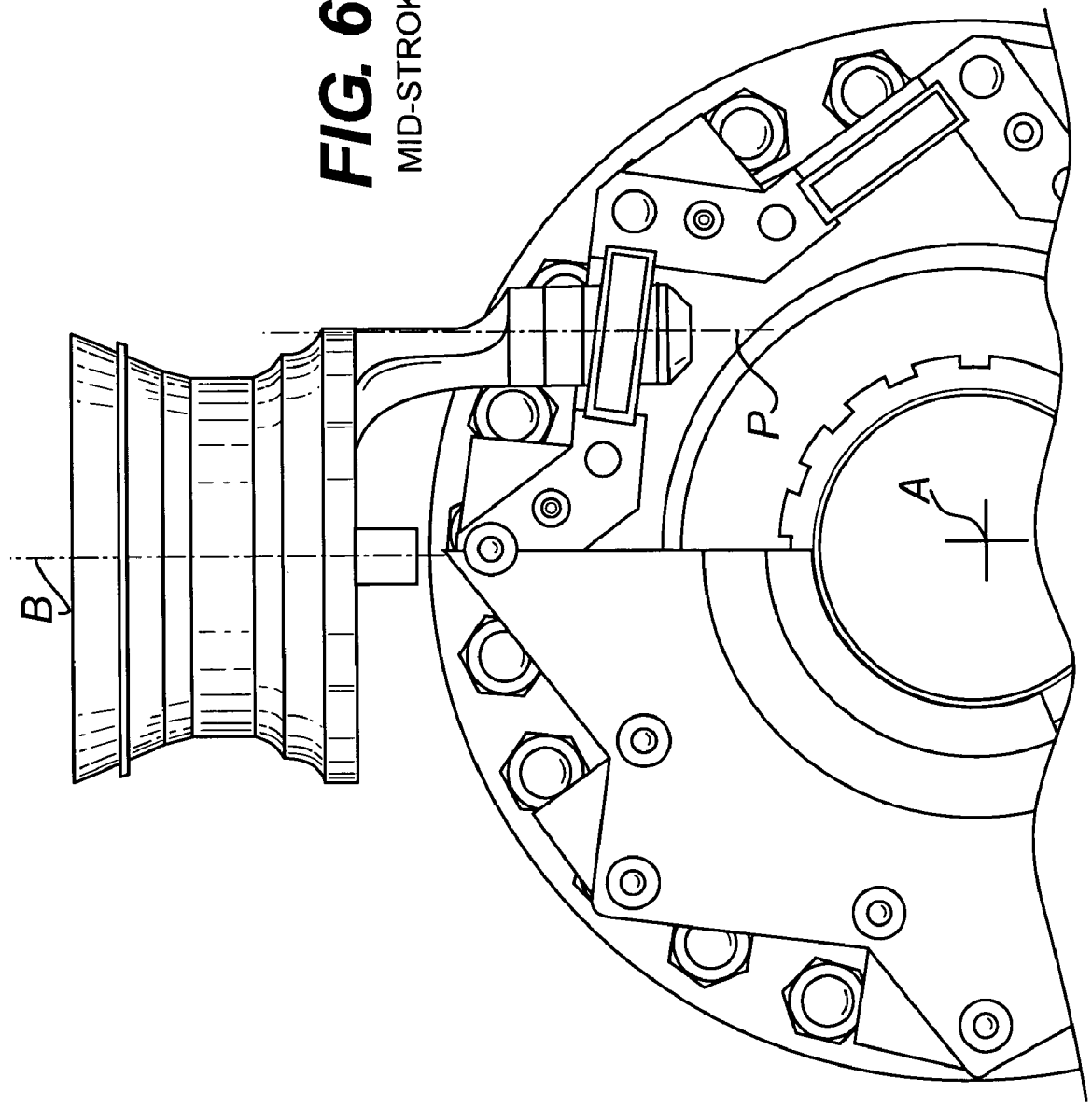

Referring to FIGS. 5A and 6A, the yoke assembly 52 is located in a forward position (+) such that the blade assembly 32 is located in the Feather position. The bearing assembly 56 is located on a pitch trunnion pin 70 of the pitch trunnion 54 which defines the axis P generally parallel to axis B. The bearing assembly 56 is displaced along axis P on the pitch trunnion pin 70 outward from the axis A. That is, the bearing assembly 56 is slidingly located toward a circumferentially outward position relative to pitch pin 70.

Figure 5B:
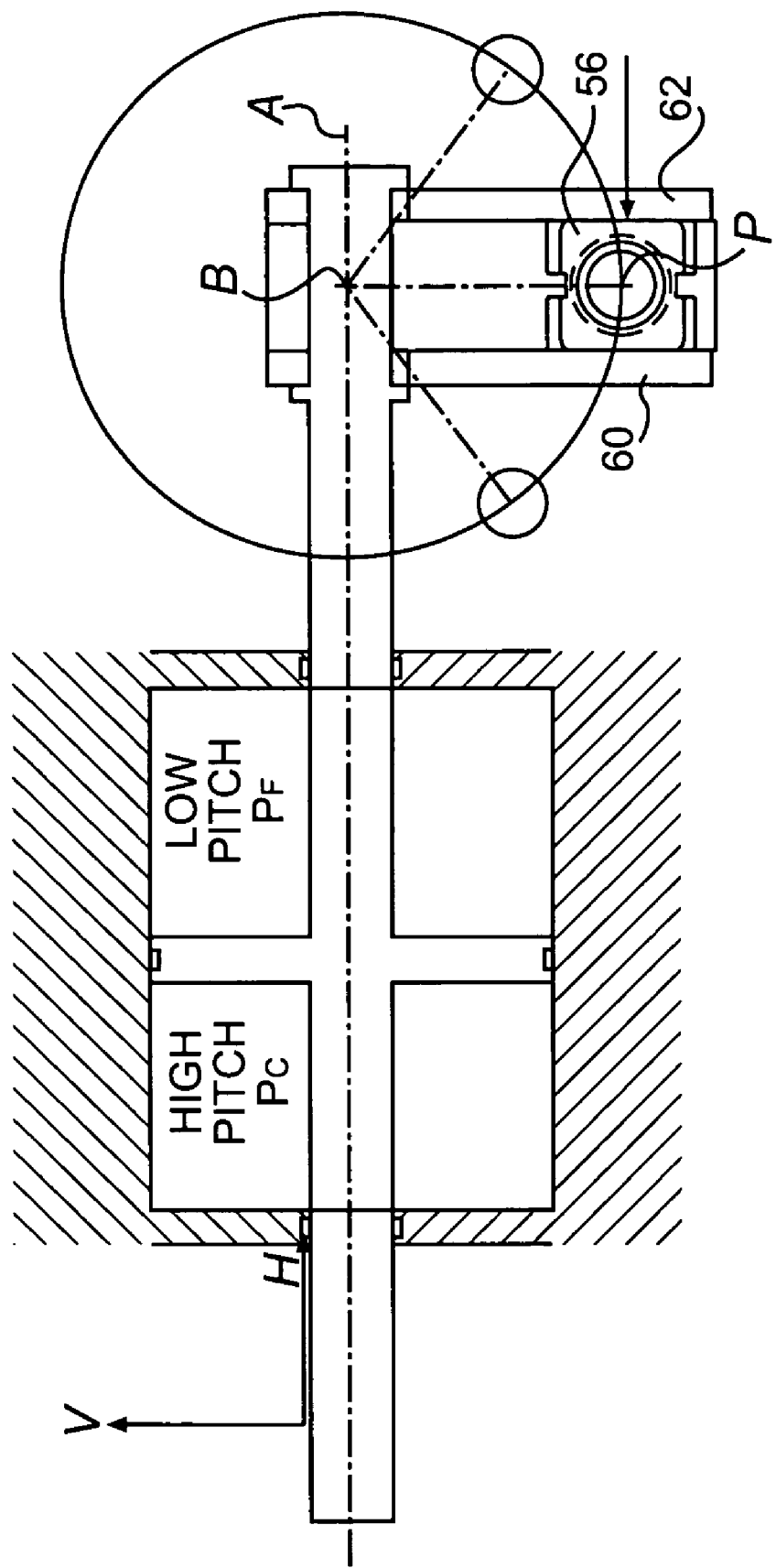
Figure 5C:
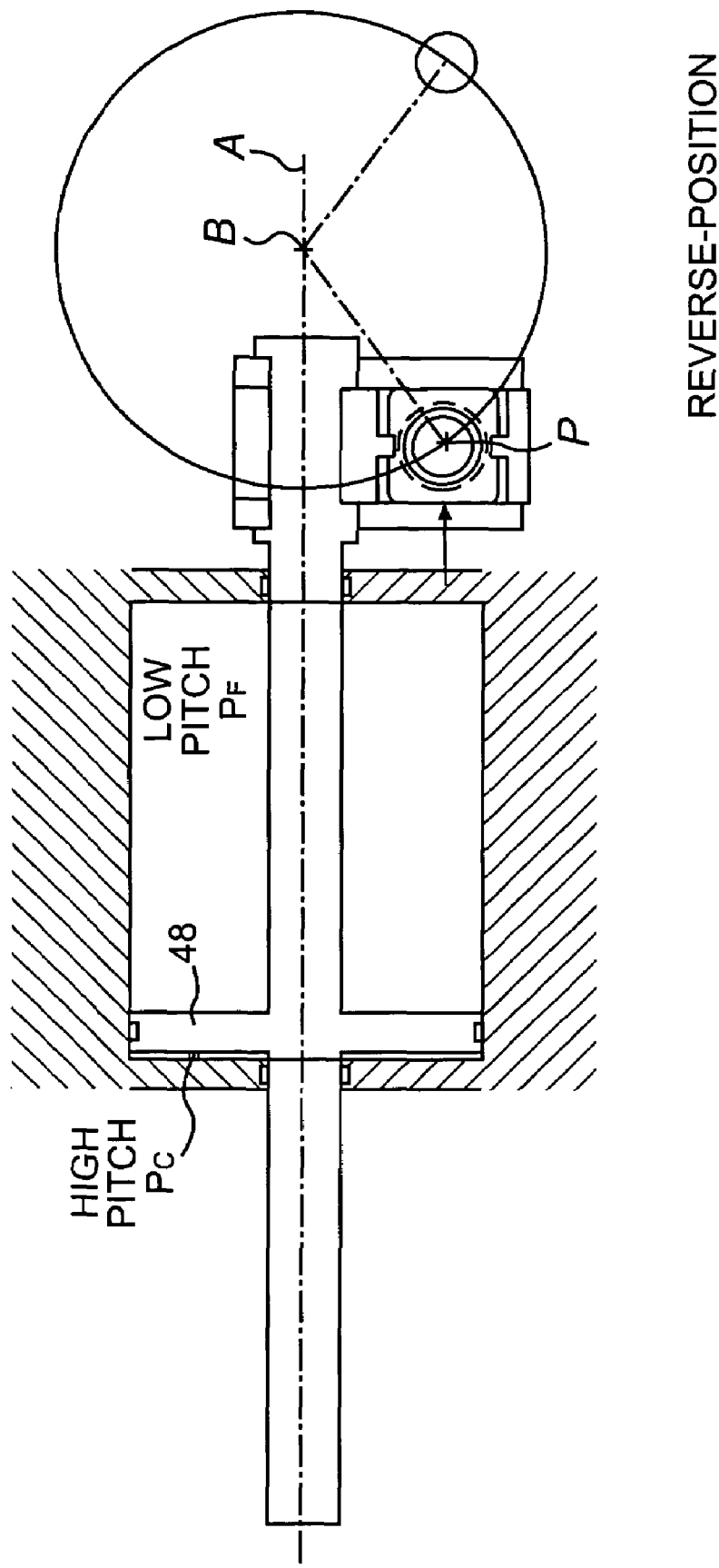

As the fine pitch actuator chamber PF is supplied with fine pitch change pressure $P_f$, the pitch change actuator piston 48 is driven aft such that the yoke assembly 52 transits axially along axis A. As the yoke assembly 52 transits axially, the pitch trunnion 54 and thus the blade assemblies 32 are pitched about axis B to pitch each blade assembly 32 toward the Top Dead Center (FIGS. 5B and 6B). Commensurate therewith, and in response thereto, the yoke assembly 52 slightly rotates about axis A and the bearing assembly 56 is displaced outward along axis P on the pitch trunnion pin 70. The rotation of the yoke assembly 52 about axis A is in response to the blade assembly 32 pitching motion to accommodate the arcuate motion of the pitch trunnion axis P (FIGS. 4A-4C). The generally rectilinear outer race 68, being retained by the spacers 66, articulates about the spherical inner race inside diameter 72 which maintains axial relationship to the pitch trunnion pin 70. That is, the rotation of the yoke assembly 52 is accommodated by the articulation the generally rectilinear outer race 68 relative the spherical inner race inside diameter 72.

As the fine pitch actuator chamber PF is further supplied with fine pitch change pressure $P_f$, the pitch change actuator piston 48 continues aft and the yoke assembly 52 transits further axially along axis A. As the yoke assembly 52 continues to transit axially, the pitch trunnion 54 and thus the blade assembly 32 is pitched about axis B to pitch the blade assembly 32 through the Top Dead Center (FIGS. 5B and 6B) and toward the Reverse position (FIGS. 5C and 6C). Notably, the bearing assembly 56 is displaced inward along axis P on the pitch trunnion pin 70 in response to the arcuate motion of the pitch trunnion 54 about axis B.

Axial movement of the yoke assembly 52 results in articulation of the bearing assemblies 56 about the blade axis B and translation up and down the pitch trunnion pin 70 axis P, while maintaining a fixed radial distance to axis A. Generally, the Top Dead Center position (FIGS. 5B and 6B) defines the bearing assembly 56 furthest inboard position relative to the pitch trunnion pin 70 while the Feather (FIGS. 5A and 6A) the Reverse position (FIGS. 5C and 6C) defines the bearing assembly 56 position furthest outboard relative to the pitch trunnion pin 70.

Assembly of the pitch change system 50 is generally accomplished by locating the aft yoke plate 62 inside the hub assembly 30 prior to installing the blade assemblies 32. The bearing assemblies 56 are placed on the pitch trunnion pin 70, then the spacers 66 are separately fastened to the aft yoke plate 62 between adjacent bearing assemblies 56. The pitch actuator assembly 40 (FIG. 3) is then installed by bolting the forward yoke plate 60 to the aft yoke plate 62. The hub assembly 30 is then completed by attaching the dome. Notably, blade assembly 32 is facilitated as the bearing assembles 52 may be readily passed through a hub blade retention opening while integrally attached to the pitch trunnion pin 70.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A pitch change system comprising:
a forward yoke plate defined about a rotor hub axis of rotation;
a multiple of bearing assemblies mounted to said forward yoke plate, each of said multiple of bearing assemblies having a rectilinear outer race; and
a multiple of spacers mounted between said forward yoke plate and an aft yoke plate, each of said multiple of spacers located between two adjacent bearing assemblies of said multiple of bearing assemblies to constrain movement thereof, wherein at least one of said multiple of spacers constrain axial movement of at least one of said multiple of bearing assemblies along a respective pitch trunnion pin axis which extends radially relative to said rotor hub axis.

2. The system as recited in claim 1, wherein each of said rectilinear outer races are generally square.

3. The system as recited in claim 1, wherein each of said multiple of bearings are movable along a pitch trunnion pin axis generally transverse to said rotor hub axis of rotation.

4. The system as recited in claim 1, wherein each of said rectilinear outer races is pivotable about said pitch trunnion pin axis.

5. The system as recited in claim 1, wherein each of said rectilinear outer races retain an inner race slidable along a pitch trunnion pin defined along said pitch trunnion axis.

6. The system as recited in claim 1, further comprising a clearance defined between at least one of said multiple of spacers and at least one of said multiple of bearings.

7. The system as recited in claim 6, wherein said clearance is defined transverse to said pitch trunnion axis.

8. The system as recited in claim 1, wherein said forward yoke plate and said aft yoke plate are axially movable along said rotor hub axis of rotation and rotatable about said rotor hub axis of rotation, said multiple of bearings movable along and pivotable relative to said pitch trunnion axis in response thereto.

9. A propulsor system comprising:
a yoke shaft defined about a rotor hub axis of rotation;
a forward yoke plate mounted to said yoke shaft;
an aft yoke plate;
a multiple of spacers mounted between said forward yoke plate and said aft yoke plate;
a multiple of bearings mounted between said forward yoke plate and said aft yoke plate, each of said multiple of bearings having a rectilinear outer race and an inner race, each of said rectilinear outer races restrained by at least one of said multiple of spacers;
a multiple of blade assemblies which each defined a blade axis that extends radially relative said rotor hub axis of rotation; and
a pitch trunnion which extends from each of said multiple of blade assemblies, said pitch trunnion having a pitch trunnion pin which defines a pitch trunnion axis offset from said blade axis, said pitch trunnion pin received within said inner race along said pitch trunnion axis.

10. The system as recited in claim 9, wherein said forward yoke plate and said aft yoke plate are axially movable along said rotor hub axis of rotation and rotatable about said rotor hub axis of rotation, each of said multiple of rectilinear outer races movable along and pivotable relative to said pitch trunnion axis in response thereto.

11. The system as recited in claim 9, wherein at least one of said multiple of spacers constrain axial movement of at least one of said multiple of bearings along the respective pitch trunnion axis.

12. The system as recited in claim 9, wherein each of said rectilinear outer races is pivotable about said pitch trunnion axis.

13. The system as recited in claim 9, wherein each of said inner races is slidable along said respective pitch trunnion pin defined along said pitch trunnion axis.

14. The system as recited in claim 9, further comprising a clearance defined between at least one of said multiple of spacers and at least one of said multiple of bearings.

15. The system as recited in claim 14, wherein said clearance is defined transverse to said pitch trunnion axis.

16. The system as recited in claim 9, further comprising a clearance defined between said aft yoke plate and at least one of said multiple of bearings.

17. The system as recited in claim 9, further comprising a clearance defined between said forward yoke plate and at least one of said multiple of bearings.

* * * * *